Dec. 13, 1932.    D. W. DOUGLAS    1,890,902
AMPHIBIAN AIR VEHICLE
Filed May 19, 1930    2 Sheets-Sheet 1
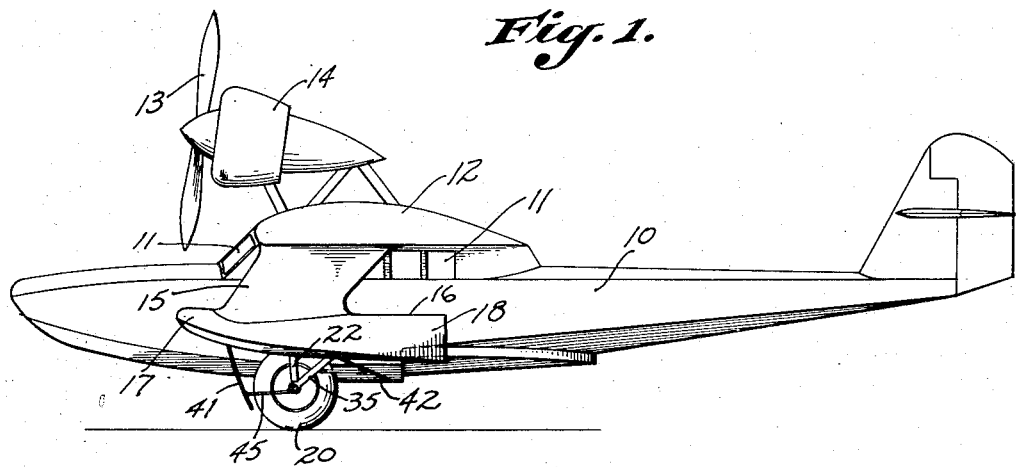
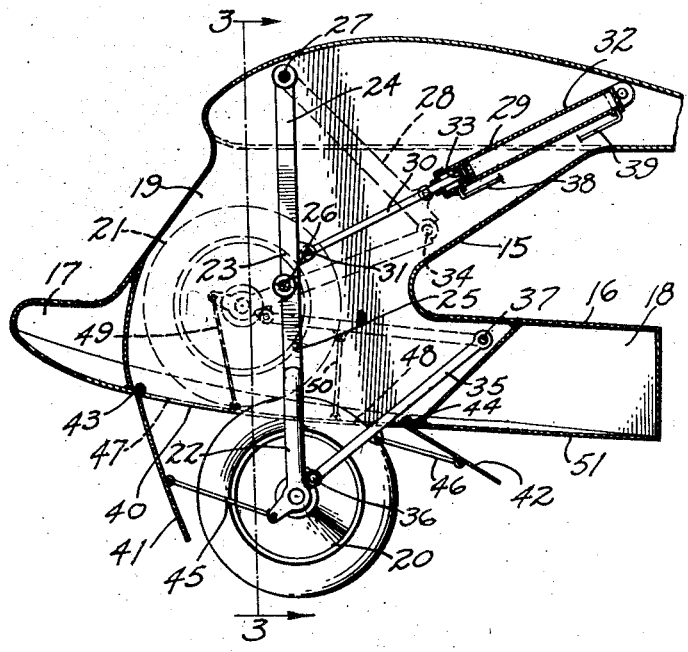 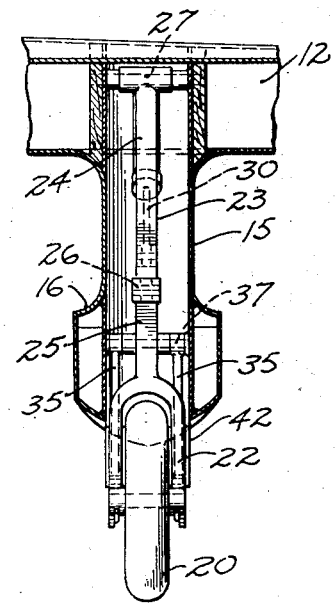
INVENTOR:
Donald W. Douglas,
ATTORNEY.

Dec. 13, 1932.                D. W. DOUGLAS                1,890,902
                          AMPHIBIAN AIR VEHICLE
                   Filed May 19, 1930        2 Sheets-Sheet 2
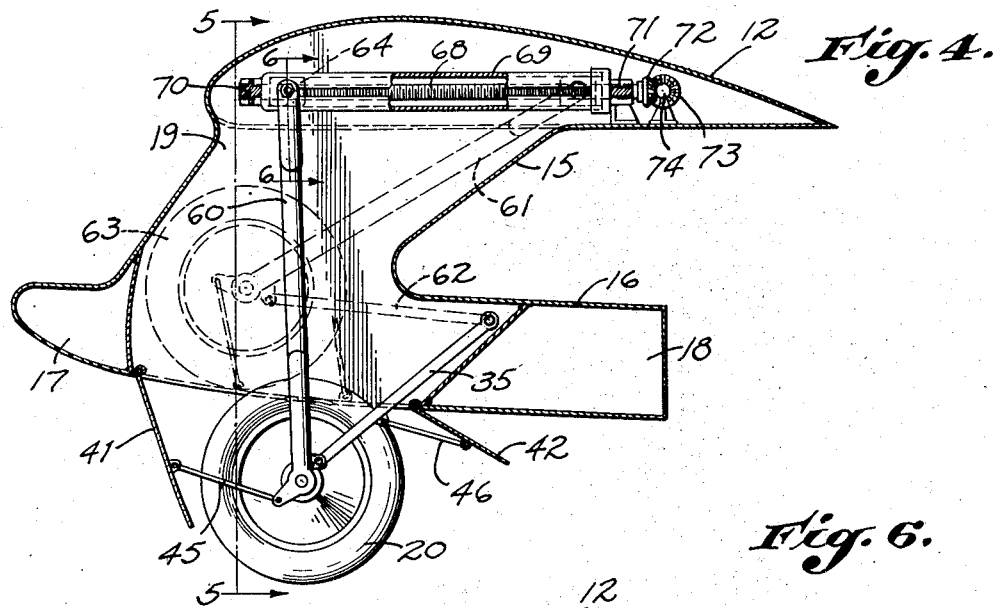
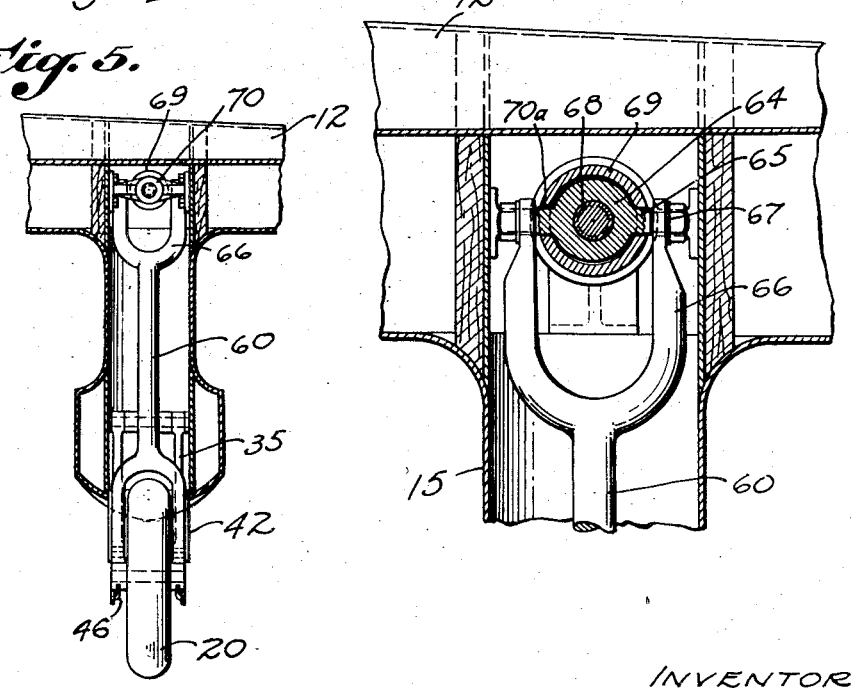
INVENTOR:
Donald W. Douglas,
BY
ATTORNEY.

Patented Dec. 13, 1932

1,890,902

UNITED STATES PATENT OFFICE

DONALD W. DOUGLAS, OF SANTA MONICA, CALIFORNIA, ASSIGNOR TO DOUGLAS AIRCRAFT COMPANY, INC., OF SANTA MONICA, CALIFORNIA, A CORPORATION OF DELAWARE

AMPHIBIAN AIR VEHICLE

Application filed May 19, 1930. Serial No. 453,516.

My invention relates to amphibian planes which are adapted for rising from or landing on land or water, and relates particularly to a plane of this character in which the landing gears, such as wheels, are movable between non-operative and operative positions.

My invention also relates to an amphibian type of plane in which the landing gear may be retracted into a housing during the flight of the plane or during the landing of the plane on water, this landing gear in retracted position offering no air resistance or air disturbance during flight and being in such position that it will not come into contact with the surface of the water on which the plane is being landed or from which take-off is made.

It is an object of the invention to provide a plane in which the landing gear is movable in and out of a chamber formed in a float or pontoon which adapts the plane for alighting on water.

It is a further object of the invention to provide closure means, such as doors, for closing the opening of the chamber into which the landing wheel is retracted, such doors being so made that when in closed position they will present an outer surface continuous with the lower surface of the housing or pontoon in which the chamber is formed, thereby equipping the pontoons for landing on land by the use of devices which will not interfere with the alighting of the plane on water.

A further object of the invention is to provide means for closing the chamber, which means is operable by and with the mechanism for projecting and retracting the landing gear.

Other objects and advantages will be made evident throughout the following part of the specification.

Referring to the drawings which are for illustrative purposes only:

Fig. 1 is an elevational view showing my improved amphibian type of airplane having landing wheels which are entirely concealed when the plane is in flight and during its landing on water.

Fig. 2 is an enlarged sectional view of diagrammatic character showing the interior of the pontoon and landing-gear structure shown in Fig. 1.

Fig. 3 is a fragmentary section on a plane represented by the line 3—3 of Fig. 2.

Fig. 4 is a sectional view similar to Fig. 2, showing an alternative form of retractile landing-gear mechanism.

Fig. 5 is a fragmentary section on a plane represented by the line 5—5 of Fig. 4.

Fig. 6 is an enlarged fragmentary section taken as indicated by the line 6—6 of Fig. 5.

My new amphibian type plane, as shown in Fig. 1, includes a fuselage structure 10 having the form of a gondola adapted for flotation on water, such gondola being equipped with a passenger cabin 11 and a laterally extending wing structure 12. The power means for operating the plane resides in a propeller 13 driven by a motor carried in a separate structure 14 which is mounted above the gondola 10. On each side of the gondola 10, as shown in Figs. 1 and 3, a housing 15 projects downwardly from the wing structure 12.

In the illustration of the invention in the drawings, the wing and other structure are merely shown in outlines, the reinforcing structure not being pertinent to the present invention which concerns the outer configuration of the plane and the novel form of alighting and landing gear, it being understood that the terms "alighting" and "landing" are respectively used relative to water and land or solid surfaces such as presented by the deck of a vessel. Throughout the specification the description will be limited to a single landing gear and its cooperative mechanism although it is to be understood that two of such landing-gear devices, or more, are used in conjunction.

As shown in Figs. 2 and 3, the lower portion of the housing 15 is elongated in the form of a pontoon or float 16, there being enclosed air chambers 17 and 18 at the front and back portions of the pontoon to provide positive flotation. Within the housing 15 and the wing structure 12 adjacent thereto a chamber 19 is provided in which means or gear for use in landing on the ground may be contained. The customary and preferable form of this landing gear includes a wheel 20 especially equipped for such service. I adapt this wheel 20 for movement from the projected position in which it is shown in full lines in Figs. 1, 2 and 3 to the retracted position indicated by the dotted lines 21 of Fig. 2, by mounting such wheel 20 at the lower end 22 of a collapsible strut 23 consisting of an upper leg 24 and a lower forked leg 25 hinged to the upper leg at 26, a joint being formed at such point of hinging adapted to break in one direction only.

The upper end of the leg 24 is hinged at 27 to the structure of the plane, this leg 24 swinging in rightward direction into the position indicated by dotted lines 28 when a puller mechanism 29 including a rod 30 pivoted at 31 to the leg 24 at a point near the lower end thereof is operated to collapse the strut 23 which collapsion is accomplished by swinging the leg 24 from its vertical position into the position indicated by dotted lines 28, this action being accomplished by pressure of a fluid acting within a cylinder 32 of the operating mechanism 29 to move a piston 33 rightwardly from the position in which it is shown in full lines in Fig. 2.

As the point of hinging between the upper and lower legs 24 and 25 swings toward the position indicated by dotted lines 34, the lower end of the leg 25 swings upwardly on radius rods 35 hinged at 36 to the lower end of the leg 25 and hinged at 37 to a stationary part of the pontoon structure, the leg 25, the wheel 20, and the radius rods 35 assuming the position in which they are shown in dotted lines.

It will be perceived that by introducing a fluid under pressure through the respective pressure pipes 38 and 39 the landing-gear supporting structure may be either collapsed or extended, thereby making it possible to control the position of the landing gear in or out of its enclosing chamber from the pilot's compartment of the plane. An opening 40 of the housing 15 through which the landing gear may be projected from a position within the housing to an operative position is equipped with closure means, having in the present embodiment of my invention the form of doors 41 and 42 hinged at 43 and 44, and connected by links 45 and 46 to the landing-gear supporting structure in such a manner that these doors 41 and 42 will assume definite positions relative to the retracted and extended positions of the landing-gear supporting structure.

When the landing gear represented by the wheel 20 is in projected operative position the links 45 and 46 will hold the door members 41 and 42 in open position, in which they are shown in full lines in Figs. 1 and 2, and will move these doors into the closed positions indicated by the dotted lines 47 and 48 of Fig. 2, when the supporting structure is collapsed, the links 45 and 46 then occupying the positions indicated by the dotted lines 49 and 50. The closure means are so formed and constructed that when in closed position represented by the dotted lines 47 and 48, they will present a continuous lower float or pontoon surface coextensive with the bottom 51 of the pontoon 16, thereby enabling the pontoon to move smoothly and without interference over the surface of the water, or through the air when the plane is in flight, this feature being of considerable importance owing to the fact that every element of resistance, no matter how small, detracts from the efficiency of the plane.

It will be recognized that whereas I have shown the invention applied to an amphibian type of plane, certain of the principles presented may be employed to good advantage in planes intended only for landing upon solid surfaces in that by the use of my invention the wheels of my airplane may be removed from engagement with the air and disturbance and consequent resistance caused by such engagement eliminated during the flight period.

In Figs. 1 to 3 I have shown a landing-gear operating and supporting mechanism which includes a collapsible strut. In Figs. 4 to 6 I represent an alternative form of mechanism which includes a rigid strut member 60 supporting at its lower end a wheel 20 and adapted to be swung from the position in which it is shown in full lines to the position in which it is indicated by dotted lines 61 of Fig. 4, so as to accomplish an upward swinging of the radius rod or link 35 from its position indicated in full lines to its position indicated by dotted lines 62, thereby accomplishing movement of the wheel 20 from the extended position shown in full lines to retracted position shown in dotted lines 63.

For the purpose of swinging the strut member 60 between the two positions indicated, I provide a sliding nut 64 as shown in Figs. 4 and 6, this nut having trunnions 65 for pivotally receiving forks 66 of the member 60 as indicated at 67, and being threaded on a screw 68 which extends longitudinally within a tubular casing 69 having slots 70a for extension of the trunnions 65. The casing 69 is supported in horizontal position in the upper portion of the chamber 19 provided in the housing 15 and the adjoining portion of the wing structure 12, the screw 68 being carried in journals 70 and 71 so that it may be rotated by means of a beveled gear 72 situated on an extending end of the screw 68 and being engaged by a cooperating gear 73 mounted on a shaft 74 which may be extended through the wing structure 12 to a suitable point of operation.

The doors 41 and 42 are connected by links 45 and 46 to the supporting and operating structure of the landing gear, whereby these doors will be held in the open positions shown in Figs. 4 and 5 when the wheel 20 is projected and will be thereby moved into closed position when the supporting structure is operated to move the wheel 20 into the position indicated by the dotted lines 63. The extent to which it may be desired to project the wheel 20 from its housing is one of choice or one which may be determined by the construction of the airplane with which the invention is employed; for instance, it may be necessary in certain forms of construction to project the wheel 20 into a position substantially outside of the receiving chamber, while in other forms of construction it may be necessary to project only a small portion of the wheel sufficient to make engagement with a surface upon which the plane is to land.

Although I have illustrated the principles and elements of my invention in simple form it is recognized that some of the parts thereof are representative of certain other elements, parts, or mechanisms capable of accomplishing equivalent functions in substantially the same manner; therefore, it is to be understood that the invention is not limited to the details of this disclosure but is of the scope set forth in the following claims.

I claim as my invention:

1. A plane of the character described, including: a housing having an opening; a landing member; operating means for moving said landing member in and out of said housing through the opening thereof, forward and rearward door members hinged in positions to close said opening; and mechanism operative in conjunction with said operating means for closing and opening said doors relative to the moving of said landing member in and out of said housing.

2. A plane of the character described, including: a gondola; wing structure extending laterally with respect to said gondola; a housing extending down from said wing adjacent said gondola structure, having an opening; a landing member; mechanism for moving said landing member in and out of said housing through said opening; and closure means adapted to close said opening when said landing member is within said housing.

3. A plane of the character described, including: a gondola; wing structure extending laterally with respect to said gondola; a housing extending down from said wing adjacent said gondola structure, having an opening; a landing member; mechanism for moving said landing member in and out of said housing through said opening; closure means adapted to close said opening when said landing member is within said housing; and means operative by said mechanism for moving said landing member adapted to close and open said closure means relative to the moving of said member in and out of said housing.

4. A device of the character described, including: a vehicle structure; a collapsible strut comprising an upper leg hinged at its upper end to said vehicle structure and a lower leg hinged to the lower end of said upper leg, thus forming a hinge adapted to break in a rearward direction, a radius rod hinged near the lower end of said lower leg and to said vehicle structure to the rear of said collapsible strut, the point of hinging to said vehicle structure being so placed that said radius rod will swing upwardly when said collapsible strut is collapsed; a wheel carried by said lower leg; and means engaging said collapsible strut near the center thereof adapted to move said legs between aligned and disaligned positions.

5. In a plane of the character described, including: a gondola; wing structure extending laterally with respect to said gondola; a housing extending downward from said wing; a pontoon at the lower part of said housing, said pontoon having an opening in the lower part thereof; a landing member; and mechanism located within said pontoon and said housing for moving said landing member in and out of said pontoon through said opening.

6. In a plane of the class described, the combination of: a plane structure; a collapsible strut comprising an upper leg hinged at its upper end to said plane structure and a lower leg hinged to the lower end of said upper leg, thus forming a hinge adapted to break in a rearward direction; a radius rod hinged to said plane structure in the rear of said collapsible strut and to said lower leg; a landing member carried by said lower leg; and means for collapsing said collapsible strut.

7. A plane of the character described, including: a housing having an opening; a landing member; operating means for moving said landing member in and out of said housing through said opening; door means movable between closed and open positions, said door means including forward and rearward doors; and door moving means connected to said door means and to said operating means whereby said door means is positively moved between closed and open positions, said door moving means including links connected to said forward and rearward doors and to said operating means.

8. A plane of the character described, including: a housing having an opening; a landing member; operating means for moving said landing member in and out of said housing through said opening; door means movable between closed position, in which said opening is closed, and open position, said door means including a portion which is moved into a position in front of said landing means when said landing means is exterior of said housing; and door moving means connected to said door means and to said operating means whereby said door means is positively moved between closed and open positions.

In testimony whereof, I have hereunto set my hand at Santa Monica, California, this 9th day of May, 1930.

DONALD W. DOUGLAS.